United States Patent [19]

Mitsuoka et al.

[11] Patent Number: 5,555,115
[45] Date of Patent: Sep. 10, 1996

[54] OPTICALLY ADDRESSED SPATIAL LIGHT MODULATING SYSTEM BIAS LIGHT SOURCE AND METHOD FOR DRIVING THE SYSTEM

[75] Inventors: Yasuyuki Mitsuoka; Tadao Iwaki; Nobuyuki Kasama, all of Tokyo, Japan

[73] Assignee: Seiko Instruments Inc., Japan

[21] Appl. No.: 954,316

[22] Filed: Sep. 30, 1992

[30] Foreign Application Priority Data

Mar. 10, 1991 [JP] Japan .................... 3-256816

[51] Int. Cl.$^6$ ............................ G02F 1/135
[52] U.S. Cl. ............ 359/72; 359/48; 359/256; 359/56
[58] Field of Search ............ 359/48, 85, 72, 359/250, 252, 255, 56, 246, 247, 256, 100

[56] References Cited

U.S. PATENT DOCUMENTS

| | | | |
|---|---|---|---|
| 4,941,735 | 7/1990 | Moddel et al. | 359/72 |
| 5,130,830 | 7/1992 | Fukushima et al. | 359/72 |
| 5,191,408 | 3/1993 | Takanashi et al. | 359/72 |
| 5,221,980 | 6/1993 | Yamamoto et al. | 359/56 |
| 5,274,716 | 12/1993 | Mitsuoka et al. | 359/561 |

Primary Examiner—William L. Sikes
Assistant Examiner—Tai V. Duong
Attorney, Agent, or Firm—Adams & Wilks

[57] ABSTRACT

An optically addressed spatial light modulating system comprises a spatial light modulator using a liquid crystal material. A writing light irradiation device irradiates a writing light which records an image onto the spatial light modulator. A reading out light irradiation device irradiates a reading out light which is used to read out the recorded image from the spatial light modulator. A bias light irradiation device irradiates a bias light onto the spatial light modulator, and a bias light adjustment device changes at least one of the irradiation time and the light intensity of the bias light. A driving device supplies writing voltage signals to the spatial light modulator. The irradiation time of the write light and the irradiation time of the bias light overlap with the application time of the write voltage of the spatial light modulator for a predetermined amount of time for adjusting the sensitivity of the spatial light modulator. Thus, the changing of the recording sensitivity of the optically addressed spatial light modulator is facilitated. It is also possible to write data into the spatial light modulator operating at a high speed by changing the threshold of the write image and to record an image with low write light intensity.

14 Claims, 7 Drawing Sheets

(a) FLC OASLM driving voltage (b) Light intensity of read out light (c) Light intensity of an image which is read out

FIG. 6

(a)
FLC OASLM
driving voltage (b)
Light intensity of
read out light (c)
Light intensity of
an image which
is read out

FIG. 7

(a)
FLC OASLM
driving voltage (b)
Light intensity of
read out light (c)
Light intensity of
an image which
is read out

FIG. 8

OPTICALLY ADDRESSED SPATIAL LIGHT MODULATING SYSTEM BIAS LIGHT SOURCE AND METHOD FOR DRIVING THE SYSTEM

BACKGROUND OF THE INVENTION

This invention is related to an optically addressed spatial light modulator and a method for changing the relative sensitivity of an optically addressed spatial light modulator using a ferroelectric liquid crystal material and so on as a light modulation material in the fields of optical information processing and optical measurement.

In the fields of optical information processing and optical measurement, as researches have progressed, there arises a need for a spatial light modulator having high resolution and fast response time. Conventionally, an electro-optic crystal material such as a BSO crystal material ($Bi_{12}SiO_{20}$ crystal) has been used as a light modulation material of many optical addressing spatial light modulators, and a liquid crystal light valve using a nematic liquid crystal material has also been employed as an optical addressing spatial light modulator in many cases. However, these materials are not sufficient to meet the above requirements relating to resolution and response time. Then, recently there has been developed and already used an optical addressing spatial light modulator using a ferroelectric liquid crystal material as the light modulation material (hereinafter abbreviated as "FLC-OASLM").

Figure 2:
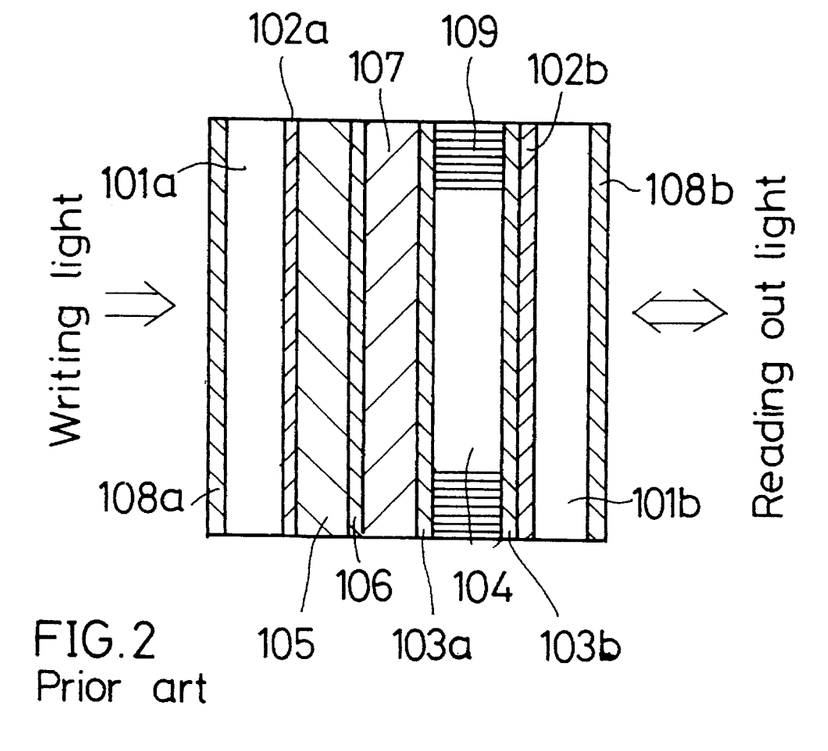
FIG. 2 is a sectional view showing the structure of a conventional FLC-OASLM.

First of all, the structure of the FLC-OASLM will be explained. The FLC-OASLM is different from the conventional liquid crystal light valve using the nematic liquid crystal material in respect of using, as a liquid crystal layer, the ferroelectric liquid crystal material which has clear bistability between light transmittance or light reflectance and an applied voltage. FIG. 2 is a sectional view showing the structure of the FLC-OASLM. On the surfaces of transparent substrates 101a, 101b made of glass, plastic and so on for sandwiching liquid crystal molecules are provided transparent electrode layers 102a, 102b, and alignment layers 103a, 103b which are formed by evaporating silicon monoxide obliquely at an angle ranging from 75° to 85° with a normal direction of the respective transparent substrates. The transparent substrates 101a, 101b make the respective alignment layers 103a, 103b to be opposed by controlling a gap through a spacer 109 and to sandwich a ferroelectric liquid crystal layer. There are laminated a photoconductive layer 105, a light blocking layer 106, and dielectric mirror 107 on the transparent electrode 102a of an optical write side of the FLC-OASLM and under the alignment layer 103a. Anti-reflection coating layers 108a, 108b are formed respectively on the outsides of the transparent substrate 101a on the write side and the transparent substrate 101b on the read side, which constitute a cell.

Next, two types of methods for initializing the FLC-OASLM having the above structure are described. In the first method, an entire plane of the write side of the FLC-OASLM is once irradiated with light. A pulse voltage, a direct current bias voltage, or a direct current bias voltage which is superimposed with an alternating current voltage between 100 Hz and 50k Hz are applied as an erasing voltage between the transparent electrode layers 102a and 102b. These voltages are sufficiently higher than a threshold voltage at the time of irradiation. Then, all of ferroelectric liquid crystal molecules are arranged in one direction resulting in a stable status, and the status is recorded. In the second method, the FLC-OASLM is not irradiated with light at all. A pulse voltage, a direct current bias voltage, or a direct current bias voltage which is superimposed with an alternating current voltage between 100 Hz and 50k Hz are applied as an erasing voltage between the transparent electrodes 102a and 102b. These voltages are sufficiently higher than a threshold voltage at the time of no irradiation. Then, all of ferroelectric liquid crystal molecules are arranged in one direction resulting in a stable status, and the status is recorded. Generally, the threshold voltage at the time of no irradiation is higher than that at the time of irradiation.

Further, explanation will be given as to operations to be done after the FLC-OASLM is initialized as explained above. A pulse voltage, a direct current bias voltage, or a direct current bias voltage which is superimposed with an alternating current voltage between 100 Hz and 50k Hz are applied as a write voltage between the transparent electrode layers 102a and 102b. Those voltages have a polarity reverse to that of the voltage used for initialization, and are lower than the threshold voltage when light is irradiated, and are higher than the threshold voltage when no light is irradiated. While the write voltage is applied, and image is optically written in by laser beam and so on. Carriers are generated in the photoconductive layer 105 in the region irradiated with laser, and the carriers move toward an electric field. As a result, the threshold voltage declines, and an applied voltage which is higher than the threshold voltage and has a polarity reverse to that of the voltage used for initialization is applied to the region irradiated with laser. Then, the molecules reverse in the ferroelectric liquid crystal material accompanying the reverse of spontaneous polarization, and the ferroelectric liquid crystal material turns out from one stable status to another. Therefore, an image is binarized and recorded. The recorded image remains recorded even when a drive voltage becomes zero.

The image binarized and recorded in the above manner can be read out either in a positive or a negative by irradiating read light of linearly polarized light which is arranged so that its polarization axis should be in the direction of the liquid crystal molecules arranged in one direction by initialization (or in a direction perpendicular to the above direction), or by passing the reflected light of a dielectric mirror 107 through an analyzer which is arranged so that its polarization axis should be perpendicular to (or parallel to) the polarization direction of the reflected light. A polarization beam splitter is often used as an analyzer.

Figure 3:
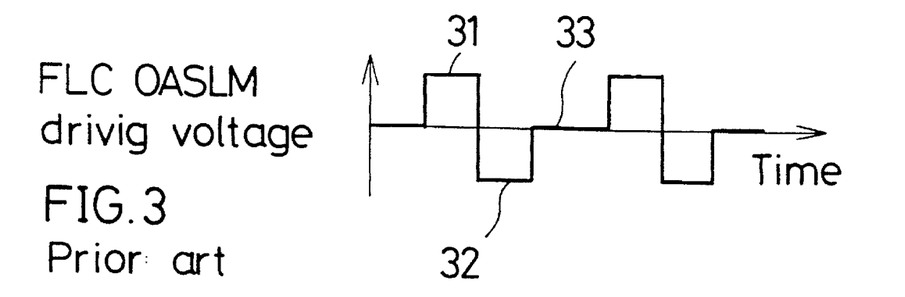
FIG. 3 is a wave form chart showing one example of the driving voltage which is conventionally applied to the FLC-OASLM.

In theory, it is possible to initialize the FLC-OASLM and memorize an image in the above-mentioned method. However, as a practical method for driving the FLC-OASLM, such driving voltage as indicated in FIG. 3 is applied to the FLC-OASLM in order to record, erase and read out an image in many cases. FIG. 3 shows one example of driving voltage wave forms which are applied to the FLC-OASLM when the transparent electrode layer 102a on the read side is grounded. In the conventional FLC-OASLM, write light and read light always irradiate respectively the write side (the side of the transparent substrate 101a) and the read side (the side of the transparent substrate 101b) of the FLC-OASLM. The FLC-OASLM is initialized by being applied with a positive pulse voltage (referred to as an erasing pulse 31) which is an erasing voltage. A picture image is recorded by a negative pulse voltage (referred to as a write pulse 32) as a write voltage, and an image memorized by the write pulse 32 and zero voltage 33 is read out. With this method, the FLC-OASLM can be driven in the frequency range from scores of Hz to several kHz.

Actually, however, it is still difficult to make a FLC-OASLM which includes the dielectric mirror 107 or the light blocking layer 106 as a light reflecting and separating layer and is uniform in a large area, and the FLC-OASLM which does not include the light reflecting and separating layer is often used. One of the courses of this fact is that installing the light blocking layer 106 or the dielectric mirror 107 makes it difficult to control a gap of about 1 to 2 μm for the injection of ferroelectric liquid crystal material and to control the alignment of the ferroelectric liquid crystal material. In the FLC-OASLM described above, a read out light is reflected on an interface of the photoconductive layer 105. The reflectance of the read-out light is approximately 20% if hydrogenated amorphous silicon is used as the photoconductive layer 105 and the wavelength of the read-out light is 633 nm.

As the photoconductive layer 105, single crystal BSO ($Bi_{12}SiO_{20}$) or single crystal silicon is sometimes used, but hydrogenated amorphous silicon is used in many cases at the present stage. The reason for using it is that the response time as a spatial light modulator can be shortened, that resolution can be improved as the thickness of the photoconductive layer 105 can be thinned, and that the manufacture is facilitated.

However, a light addressed spatial modulator, especially the FLC-OASLM described above, has some problems as follows. When hydrogenated amorphous silicon is used as the photoconductive layer 105, for instance, the energy necessary for the record into the FLC-OASLM per minimum spot area is in the range from 0.03 pJ to 0.2 pJ and does not have a multiplication action as a photomultiplier does. It cannot be said that the recording sensitivity is enough in this case. In other words, the major factor in restricting the application of the FLC-OASLM is that an image cannot be recorded without the write light of fairly strong intensity.

When the FLC-OASLM is used as an incoherent to coherent transducer, as one example of the application, outdoor scenery, parts flowing along production lines in a factory and so on are imaged on the photoconductive layer 105 by the use of an imaging lens in order to record images of the scenery and the parts. However, the intensity of such a write light (intensity of the image imaged on the FLC-OASLM) is generally much too weak to record. Further, if a Fourier transformed image is recorded on the FLC-OASLM used in an optical pattern recognition system, a high frequency component of the Fourier transformed image has a remarkably weaker intensity compared with its low frequency component. Consequently, the high frequency component cannot be recorded, and accurate pattern recognition is difficult.

In the above case, images could be recorded by improving the sensitivity of the FLC-OASLM itself or by intensifying the intensity per unit area of the write light. Then, the write light intensity per unit area could be intensified by raising luminance of the light source illuminating an object or by reducing the size of a written image. However, it is very difficult to improve substantially the sensitivity of the FLC-OASLM itself and the luminance of the light source. Further, the size of the written image seldom can be substantially reduced because of problems related to the resolution and application of the FLC-OASLM. As explained above, in the conventional method the application of the FLC-OASLM cannot be expanded, for example, by application to the incoherent to coherent transducer, because it is difficult to intensify the intensity of the written image for the purpose of writing an image with weak write light intensity to the FLC-OASLM.

There is another problem in that the sensitivity is different depending on the wavelength of the write light, which is one of the spectral sensitivity characteristics. For instance, if hydrogenated amorphous silicon is used as the photoconductive layers 105, sensitivity is high on wavelengths approximately between 600 nm and 650 nm, but quite low on other wavelengths. As a result, when white light is used as the light source of the write light, an image cannot be recorded either, if the entire light intensity is strong but the spectral intensity of the wavelength on which sensitivity is high for hydrogenated amorphous silicon is weak. Moreover, there could be a case in which a wavelength with low sensitivity must be used as the write light for some applications. In such a case, recording of an image is difficult as well.

Further, it is known that the accuracy of pattern recognition greatly changes if the threshold for recording the written image is changed, when an image including noise or a Fourier transformed image is recorded on the FLC-OASLM which is used in an optical pattern recognition system. It is easy to increase the threshold because it is equivalent to reducing the write light intensity with an ND filter and so on. However, there is a drawback in that it is very difficult, on the contrary, to record the written image by lowering the threshold because the sensitivity of the FLC-OASLM is insufficient.

The above drawbacks are not limited to the FLC-OASLM, but similar drawbacks exist as to general optically addressed spatial light modulators.

SUMMARY OF THE INVENTION

In view of the above drawbacks of conventional optically addressed spatial light modulators, an object of the present invention is to make it possible to change recording sensitivity easily in an optically addressed spatial light modulator which uses a liquid crystal material, for example a ferroelectric liquid crystal material, as a spatial light modulator material. The present inventive optically addressed spatial light modulator is composed of write light irradiation means for irradiating write light used to write an image to the spatial light modulator; read out light irradiation means for irradiating read out light used to read out the recorded image to the spatial light modulator; bias light irradiation means for irradiating a bias light which is used to adjust a recording sensitivity of the spatial light modulator; and bias light adjustment means for changing at least one of the irradiation time and the light intensity of the bias lights.

Further, when the spatial light modulator uses a ferroelectric liquid crystal material as an optical modulation material, the spatial light modulator is provided with driving means for driving the spatial light modulator, and the irradiation time of the write light and the irradiation time of the bias light overlap respectively with the write voltage application time of the spatial light modulator at least for a specific time.

Further, when the spatial light modulator uses a ferroelectric liquid crystal material as an optical modulation material, the spatial light modulator is provided with driving means for driving the spatial light modulator, and the irradiation time of the write light and the irradiation time of the bias light overlap respectively with the write voltage application time of the spatial light modulator at least for a specific time.

In the method for driving the optically addressed spatial light modulator which is structured as mentioned above, especially in case of the FLC-OASLM, light from an auxiliary light source or the read out light itself is irradiated to the FLC-OASLM as the bias light for the write voltage application time of the FLC-OASLM or for a part of the time. As the write light and the bias light induce a similar effect on a photoconductive layer of the FLC-OASLM, an image can be binarized and recorded when the sum of light intensity of the write light and the bias light exceeds a threshold of the FLC-OASLM. In other words, a threshold of the write light can be change relatively in proportion to the intensity of the bias light by using the bias light. It is also easy to control the threshold of the write light by adjusting the intensity of the bias light or irradiation time of the bias light. As a result, it becomes possible to record an image, which could not previously be recorded because its write light intensity per unit area is too weak, on the FLC-OASLM which is driven at a high speed, or to record a written image the threshold of which is varied. This improvement is common to optically addressed spatial light modulators which use other materials than the ferroelectric liquid crystal material as the light modulation material. In that case, it is not the threshold for binarizing an image to be recorded but the sensitivity that can be recorded.

Other features and advantages of the present invention will be apparent to those skilled in the art from the following description of the preferred embodiments, taken together with the accompanying drawings.

DETAILED DESCRIPTION OF THE PREFERRED EMBODIMENTS

Embodiments of the present invention will be explained with reference to drawings.

Figure 1:
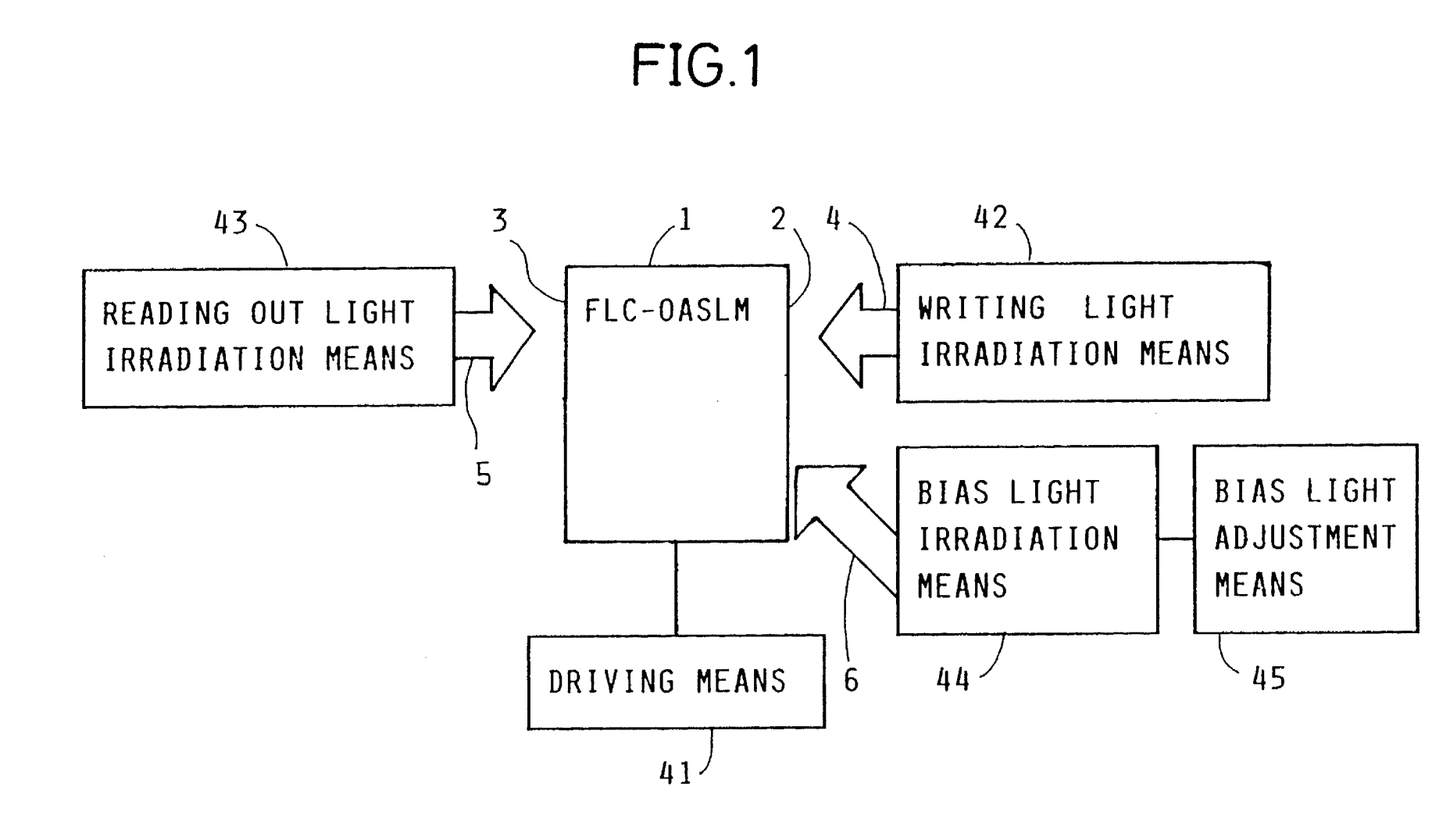
FIG. 1 is a block diagram illustrating one example of the concept of the method for driving the inventive optically addressed spatial light modulator.

FIG. 1 illustrates a concept of a method for adjusting the sensitivity of the inventive optically addressed spatial light modulator. Explanation will be given on the supposition that a FLC-OASLM, having a light reflecting and separating layer explained in FIG. 2, is taken as an optically addressed spatial light modulator. The FLC-OASLM 1 is driven by a driving means 41, and write light 4 is irradiated to its write side 2 by write light irradiation means 42, and read out light 5 is irradiated to its read side 3 by read out light irradiation means 43. Further, bias light 6 is irradiated to the write side 2 by bias light irradiation means 44. The irradiation time of the bias light 6 and its intensity are adjusted by bias light adjustment means 45. It is needless to say that the bias light 6 may irradiate not the write side 2 but the read side 3 or both of the sides, if the FLC-OASLM 1 does not have the light reflecting and separating layer, or if the bias light irradiating the read side affects a photoconductive layer 105 because of a fairly strong intensity of the bias light, or for other reasons even when the FLC-OASLM 1 does have the light reflecting and separating layer.

Figure 4:
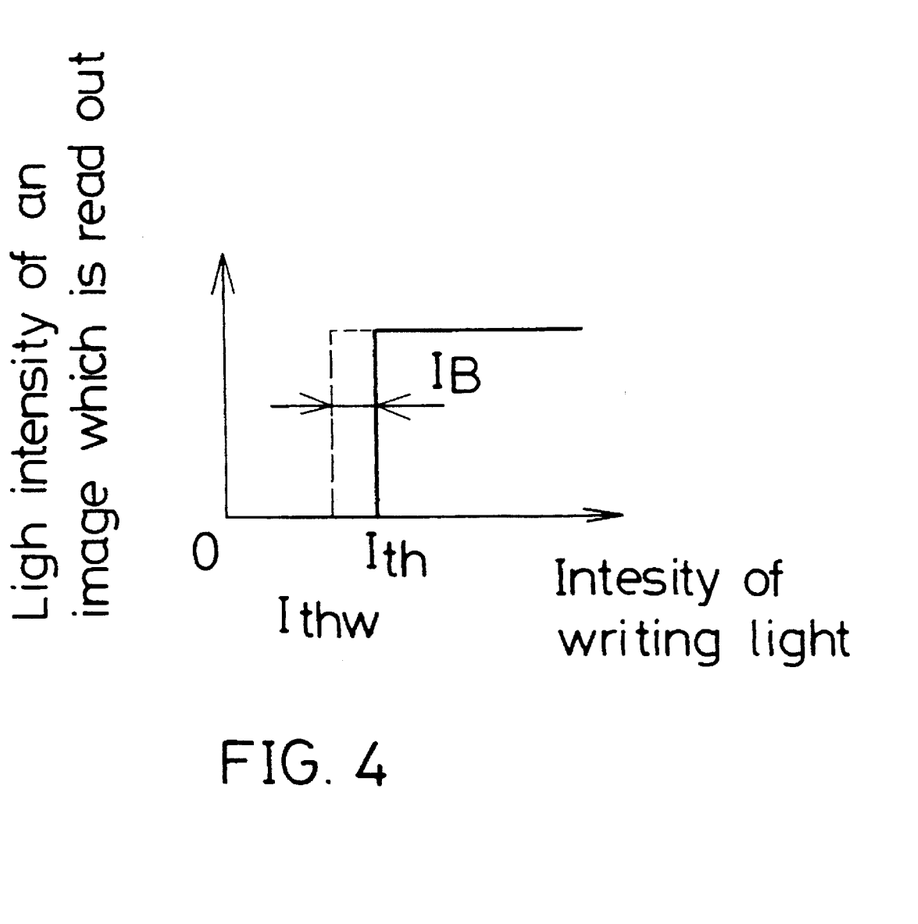
FIG. 4 is an explanatory view showing a change in sensitivity of the inventive optically addressed spatial light modulator.

FIG. 4 is an explanatory chart showing a change in the sensitivity of the FLC OASLM. In FIG. 4, a solid line represents the case where the bias light is not irradiated and a broken line represents the case where the bias light is irradiated. As the FLC-OASLM 1 uses a ferroelectric liquid crystal material as a light modulation material, its recording characteristics generally have a cleat threshold. Then, the light intensity of an image which is read out as a positive image with intensity distribution is in a dark state when a write light intensity is Ith or less, and is in a bright state when the write light intensity exceeds Ith. The bias light 6 is irradiated to the write side 2 of the FLC-OASLM 1 having such a characteristic. In order to make it simple, it is supposed that though the write light 4 and the bias light 6 have the same wavelength, they do not interfere with each other because of low coherence of the two lights, and that the light intensity on the write side 2 is equivalent to a sum of the light intensity of the write intensity 4 and the bias light 6. This feature is basically the same when the coherence is high. However, as an interference fringe is formed because of an interference between the write light 4 and the bias light 6, it is necessary to come up with some method to make a width of the interference fringe small enough as compared with resolution of the FLC-OASLM 1. The write light 4 and the bias light 6 irradiate the write side 2 for the same period of time. Further, as it is supposed that the FLC-OASLM 1 has the light reflecting and separating layer, any influence of the read light 5 is neglected. When the intensity of the bias light 6 on the write side is IB, an image can be recorded if the sum of the intensity IB of the bias light 6 and intensity IW of the write light 4, IB+IW, is the threshold Ith of the FLC-OASLM 1 or more. As a result, the threshold IthW of the write light 4 becomes Ith–IB and changes only by –IB even if the threshold Ith itself of the FLC-OASLM 1 is constant, so that it is possible to change relatively the threshold of IthW of the write light 4. Therefore, the threshold of IthW of the write light 4 can be easily controlled by changing the intensity of the bias light 6.

Further, when the bias light 6 on the photoconductive layer 105 of the FLC-OASLM 1 has light intensity distribution, the threshold IthW of the write light 4 can be distributed within the plane. For instance, when a Fourier transformed image is used as the write light 4, the FLC-OASLM 1 is irradiated with the bias light 6 and the intensity becomes stronger according to the degree the bias light 6 is separated from an optical axis of the write light 4. In such a case, the more the bias light 6 is separated from the optical axis, the lower the threshold IthW of the write light becomes, and consequently high frequency elements of the Fourier transformed image can be recorded. However, as it is generally desirable that the threshold IthW should be uniform within the plane, the bias light 6 has a uniform light intensity distribution so as to irradiate the photoconductive layer 105 uniformly.

Additionally, the irradiation time of the bias light 6 is also used for this purpose because the threshold Ith of the write light 4 depends on not only the intensity but also the irradiation time. That is, the threshold IthW of the write light 4 can be changed by adjusting the time while the write voltage application time and the irradiation time of the bias light 6 overlap and the intensity IB of the bias light 6 is changed. It is understood that the irradiation time of the write light 4 and the write voltage application time have to coincide for at least a fixed time in order to record a written image. However, the irradiation time of the write light 4 and the irradiation time of the bias light 6 do not have to overlap within the write voltage application time.

The above explanation refers to a case of recording the written image into the FLC-OASLM 1 by way of binarization. It is understood, however, that sensitivity can be changed in a similar manner by changing a waveform of the driving voltage applied to the FLC-OASLM 1 when the written image is recorded as an image having a gray scale. It is also understood that this method can be used not only for the FLC-OASLM 1 but also for any other optically addressed spatial light modulators, whether it is of a transmittable type or of a reflective type, or even if any of a BSO crystal material, a lithium niobate crystal material (LiNbO$_3$), and so on is used as the light modulation material, or even if it does not show bistability of the sensitivity. In case of a spatial light modulator which does not show the bistability of the optical response, it is not a threshold for binary recording but the sensitivity that can be controlled. However, it is understood that the driving means 41 is unnecessary when the driving voltage from outside is not required to record or erase an image such as lithium niobate crystal.

Figure 5:
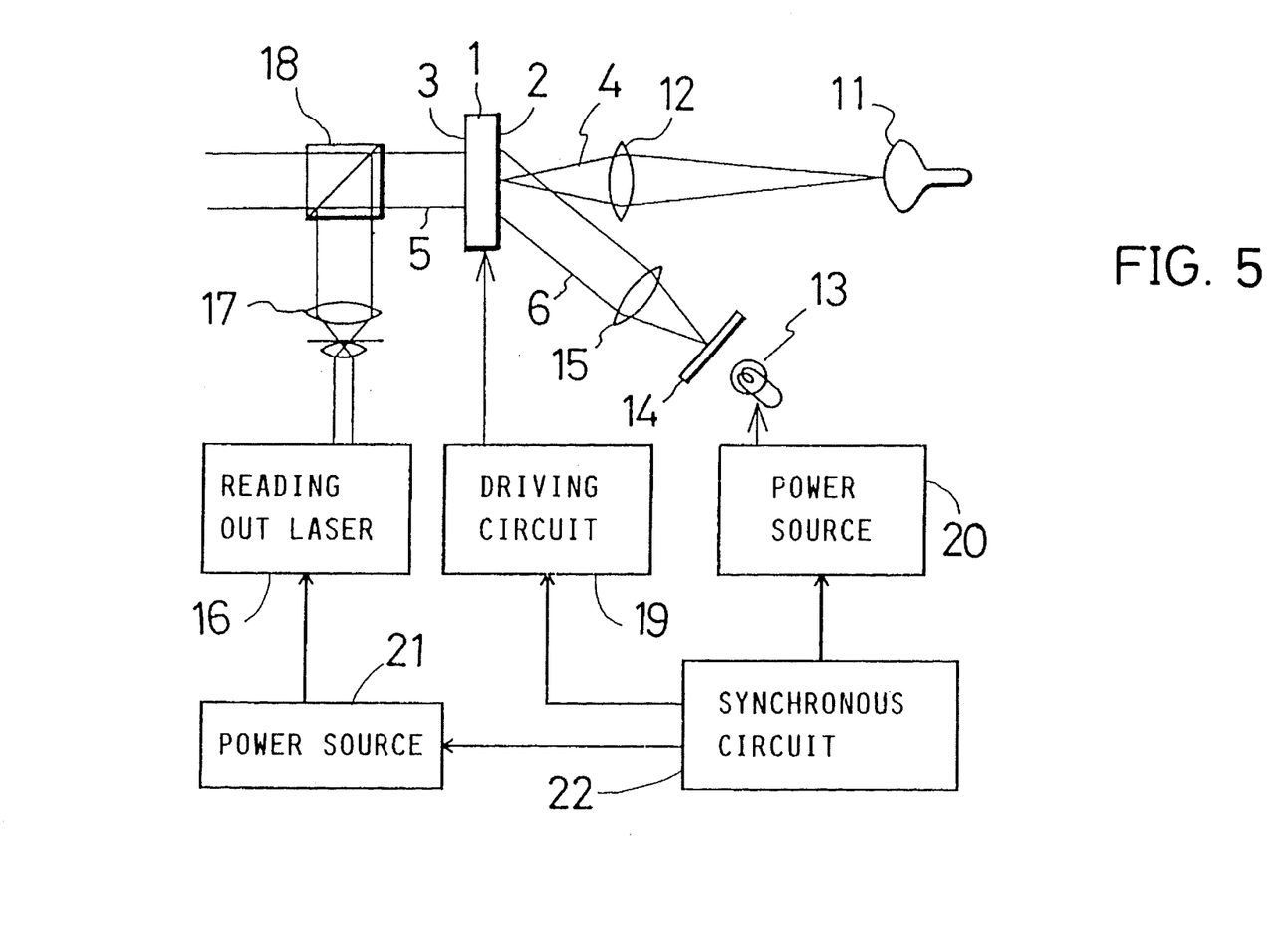
FIG. 5 is a structure view showing a structure of one embodiment of the method for adjusting the sensitivity of the inventive optically addressed spatial light modulator.

FIG. 5 is a structure diagram showing a structure of one embodiment of a method for adjusting the sensitivity of the inventive optically addressed spatial light modulator. Explanation will be given here by supposing that the FLC-OASLM 1 does not have the light reflecting and separating layer. A means for driving the spatial light modulator is a FLC-OASLM driving circuit 19. A means for irradiating the write light used to write an image into the spatial light modulator includes a CRT 11 and an imaging lens 12. A means for irradiating the read out light used to read out an image which is recorded in the spatial light modulator includes a read out laser 16, a power source 21 of the read laser, a beam expander 17, and a polarization beam splitter 18. A means for irradiating the bias light to the spatial light modulator is composed of an auxiliary light source 13, a diffusion plate 14, a projection lens 15, and a power source 20 of the auxiliary light source. A bias light adjustment means for changing at least either the irradiation time of the bias light or the intensity of the bias light includes a synchronous circuit 22.

An image which is displayed as the write light on the CRT 11 is imaged and irradiated on the photoconductive layer of the FLC-OASLM 1 by the imaging lens 12. Light generated from the auxiliary light source 13 is irradiated once to the diffusion plate 14 for eliminating the intensity distribution of the light source itself and is irradiated to the write side 2 as the bias light 6 by the projection lens 15. On the other hand, on the side of the read light, a beam outgoing from the read out laser 16 is expanded by the beam expander 17 and then reflected by the polarization beam splitter 18 to irradiate the read side 3 of the FLC-OASLM 1 as the read out light 5. The image recorded on the FLC-OASLM 1 is read out as a positive image or a negative image with intensity distribution by the effect that the read light 5 reflected on the FLC-OASLM 1 is transmitted through the polarization beam splitter 18. At this stage, the FLC-OASLM driving circuit 19, the power source 20 of the auxiliary light source, and the power source 21 of the read laser respectively drive the FLC-OASLM 1, the auxiliary power source 13, and the read out laser 16 while they synchronize by synchronization signals from the synchronous circuit 22.

Figure 6:
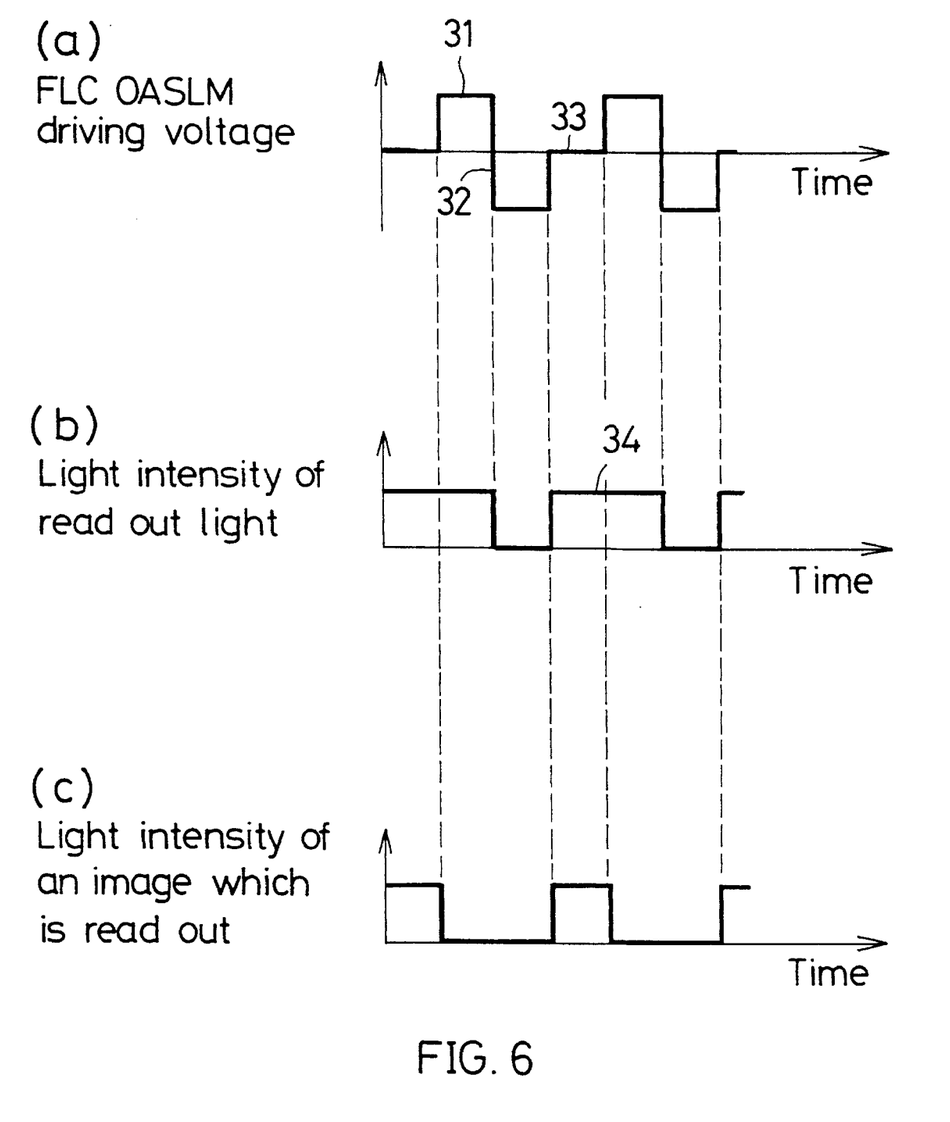
FIGS. 6(a)–6(c) illustrate a driving method of one embodiment of the method for adjusting the sensitivity of the inventive optically addressed spatial light modulator.

FIG. 6 shows a driving method used in one embodiment of a method for adjusting the sensitivity of the inventive optically addressed spatial light modulator. FIG. 6(a) shows a driving voltage waveform of the FLC-OASLM 1 at the time of grounding a transparent electrode layer 102a on the read side. FIG. 6(b) shows a change in intensity of the read out light. FIG. 6(c) shows a change in intensity of the image which is read out from the FLC-OASLM 1. As shown in FIG. 6(a), the FLC-OASLM 1 is applied with a driving voltage in which an erase pulse 31, a write pulse 32 and a zero voltage 33 are alternately repeated. In order to provide a brief explanation, it is assumed that the write light 4 and the bias light 6 constantly irradiate on the write side of the FLC-OASLM 1. Since the FLC-OASLM 1 is assumed not to have the light reflecting and separating layer, the read out light 5 is cut off only while the write pulse 32 is applied during the write voltage application time, as shown in FIG. 6(b). The read out light 5 is modulated by modulating directly an outgoing light of the read out laser 16, such as a laser diode, with the synchronous circuit 22 and the power source 22 of the read laser. This prevents the read light 5 from affecting the photoconductive layer 105 at the time of writing.

In the FLC-OASLM 1 driven in the above-mentioned manner, the write light 4 and the bias light 6 are irradiated while the write pulse 32 is applied. Consequently, the threshold of the FLC-OASLM 1 relatively declines, and an image included in the write light is given a threshold at a lower value and recorded. Then, the threshold of the write light 4 can be controlled by changing the intensity of the bias light 6. If a LED (light emitting diode), for instance, is used as the auxiliary light source 13, the brightness of the LED can be easily changed when a current applied to the LED changes. Therefore, the intensity of the bias light 6 can be changed by the current applied to the LED, so that threshold of the write light in the FLC-OASLM 1 can be controlled by the current applied to the LED.

Assuming that the bias light 6 does not constantly irradiate the write side 2 of the FLC-OASLM 1 but its light intensity is modulated, whether the intensity of the write light 4 is modulated or not, the same effect can be obtained as the intensity of the bias light 6 is changed, if the time to irradiate the bias light 6 during the write voltage application time while the pulse 32 is applied to the FLC-OASLM 1 is changed. This method can also be easily performed by use of the LED as the auxiliary light source 13. Since the written image is read out by the read out light 5 and erased by the erase pulse 31, the light intensity of the image read out as a positive image turns out a dark state when the erase pulse 31 is applied, as shown in FIG. 6(c).

As the auxiliary light source 13, a red LED for the monochromatic light and a common miniature bulb and so on for the white light are available. It is understood that the sensitivity can be changed by any auxiliary light source 13 which can generate a light having a wavelength enough to generate carriers on the photoconductive layer 105 of the FLC-OASLM 1, whether it is a monochromatic light or a white light, though the sensitivity of each depends on the wavelength.

Further, in order to irradiate the bias light 6, it is irradiated on the write side 2 of the FLC-OASLM 1. However, it is obvious that the sensitivity can be changed even if the bias light 6 irradiates the read side 3 of the FLC-OASLM 1, when the FLC-OASLM 1 does not have the light reflecting and separating layer, such as a dielectric mirror 107 or a light blocking layer 106, or when light from the read side 3 affects the photoconductive layer 105 and the FLC-OASLM 1 has the light reflecting and separating layer.

It is understood that the sensitivity of the FLC-OASLM 1 can be changes depending on mask patterns and is not uniform if a liquid crystal television set is provided as a mask in an optical path between the diffusion plate 14 and the FLC-OASLM 1.

In the above embodiment, outgoing light from the read out laser 16 such as a laser diode is directly modified by the power source 22 of the read laser in order to modify the intensity of the read out light. However, it is evident that the outgoing laser light can be used as the read out light 5 by modulating its intensity by a liquid crystal shutter which uses a nematic liquid crystal material or a ferroelectric liquid crystal material as the light modulation material, when He-Ne laser and so on are used as the read out laser 16. It is understood that the intensity of the read light 5 does not need be modulated if the FLC-OASLM 1 has the light reflecting and separating layer or if the intensity of the read out light 5 is weak and the read out light 5 does not affect the photoconductive layer 105.

As the write light 4, the above embodiment uses an image which is displayed on the CRT 11 and imaged on the FLC-OASLM 1, but an image of a car driving through the town or a Fourier transformed image irradiated is also available. It is understood that any images which are irradiated for at least a specific period and have wavelengths which are enough to generate carriers in the photoconductive layer 105 are available.

Though the auxiliary light source 13 is provided separately in the above embodiment, the read out light 5 itself can be used in place of the auxiliary light source 13 when the FLC-OASLM 1 does not have the dielectric mirror 17 and the light blocking layer used as the light reflecting and separating layer, or when the read out light 5 affects the photoconductive layer 105, for instance, the intensity of the read out light is too strong, even if the FLC-OASLM 1 has the light reflecting and separating layer.

Figure 7:
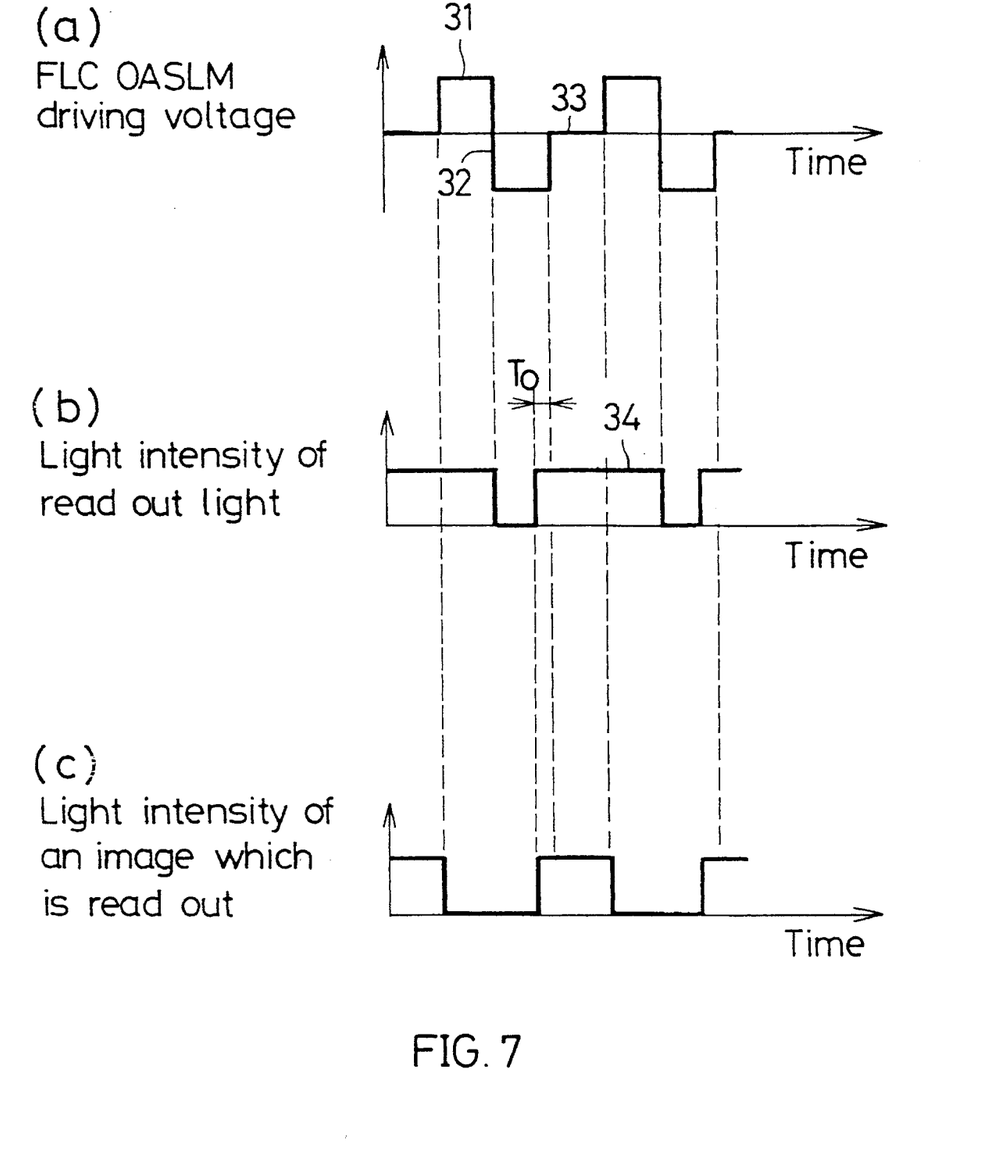
FIGS. 7(a)–7(c) illustrate a driving method of another embodiment of the method for adjusting the sensitivity of the inventive optically addressed spatial light modulator.

FIG. 7 shows a driving method of another embodiment of a method for adjusting the sensitivity of the inventive optically addressed spatial light modulator. FIG. 7(a) shows a driving voltage wave form of the FLC-OASLM 1 in case of grounding the transparent electrode layer 102a of the read side, FIG. 7(b) shows a change in intensity of the read out light, and FIG. 7(c) shows a change in intensity of an image which is read out from the FLC-OASLM 1. This embodiment is different from the embodiment shown in FIG. 6 in that since the read out light 5 acts on the write voltage application time as well as the bias light 6 disclosed in the above-mentioned embodiment by overlapping periods of the write pulse 32 and read out light irradiation 34 for a certain time T0, the threshold of the write light can be decreased. Further, a change in the threshold of the write light can be easily controlled by changing a value of T0. However, as in this case the read out light generally irradiates uniform light, it is impossible to distribute the sensitivity within a plane of the read side by distributing intensity of the read out light 5. In this case, light intensity of an image which is read out as a positive image is bright due to the irradiation of the read out light 5, and is turned to dark when the erase pulse 31 is applied.

Figure 8:
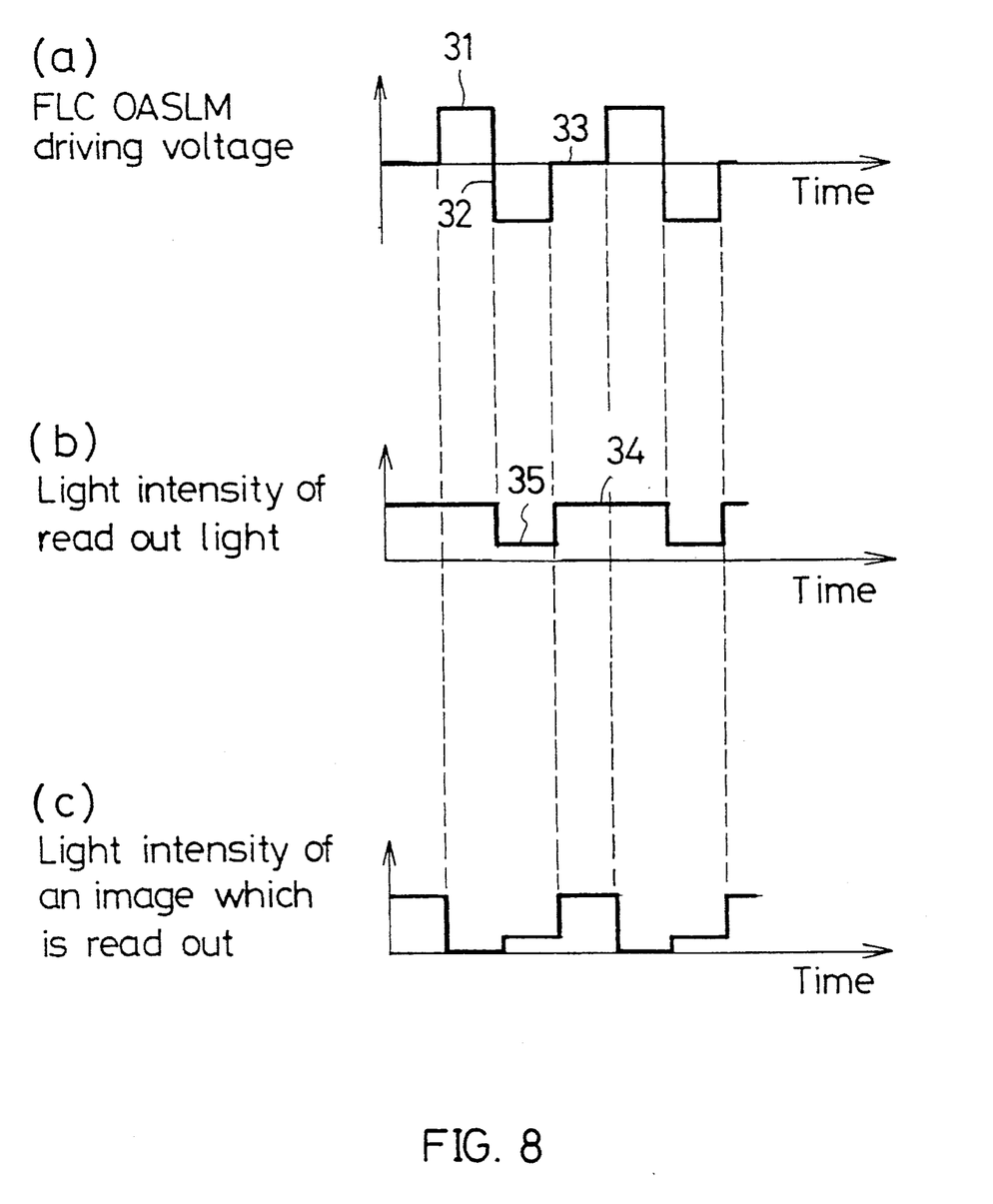
FIGS. 8(a)–8(c) illustrate a driving method of another embodiment of the method for adjusting the sensitivity of the inventive optically addressed spatial light modulator.

FIG. 8 shows a driving method of another embodiment illustrating a method for adjusting the sensitivity of the inventive optically addressed spatial light modulator. FIG. 8(a) shows a driving voltage waveform of the FLC-OASLM 1 at the time of grounding the transparent electrode layer 102a of the read side. FIG. 8(b) shows a change in intensity of the read out light. FIG. 8(c) shows a change in intensity of an image which is read out from the FLC-OASLM 1. In this driving method, when the intensity of the read out light 5 is modulated, the read out light 5 irradiates the read side 3 during the write voltage application time, and the light is used as a bias light 35. If a laser diode is used as a light source of the read out light 5, this method can be easily embodied by changing the driving voltage applied to the laser diode according to the intensity of the read out light 5. In other words, the intensity of the bias light 35 can be changed by adjusting the driving voltage of the laser diode, by providing the liquid crystal shutter in the optical path of the read out light 5, by rotating a polarization plate which is arranged in front of and behind the liquid crystal shutter or the liquid crystal shutter itself, and by adjusting the contrast of the read out light 5 being transmitted through the liquid crystal shutter. However, the intensity of the read out light irradiation 34 also changes.

As explained above, in the method for adjusting the sensitivity of the inventive optically addressed spatial light modulator, especially in case of the FLC-OASLM, the sensitivity of the FLC-OASLM can be easily controlled by irradiating the bias light during the write voltage application time of the FLC-OASLM, and changing the intensity and the irradiation time of the bias light. As a result, it is possible to record a written image the intensity of which is entirely weak and a part of a written image with weak intensity. Further, as the threshold of the write light of the FLC-OASLM can be easily changed, it is also possible to obtain an image of which the threshold for binary recording is changed.

As a result of the above, the application scope of the FLC-OASLM can be expanded, such as its use as an incoherent to coherent transducer. In addition, when the FLC-OASLM is used for pattern recognition and so on, pattern recognition can be performed with higher accuracy, for instance, it becomes possible to record a higher frequency component of a Fourier transformed image. Further, since means for irradiating the bias light does not additionally include any expensive or complicated elements, there is an advantage that it is not accompanied with a rise in cost.

What is claimed is:

1. An optically addressed spatial light modulating system comprising: a spatial light modulator having a pair of transparent substrates and a photoconductive layer formed on at least one inner side of the pair of transparent substrates; writing light irradiation means for irradiating a writing light to record an image onto the spatial light modulator; reading out light irradiation means for irradiating a reading out light to read out the recorded image from the spatial light modulator; bias light irradiation means for irradiating the photoconductive layer of the spatial light modulator with a uniform light intensity distribution to adjust a recording sensitivity of the spatial light modulator; and bias light adjusting means for adjusting at least one of the irradiating time and the light intensity of the bias light.

2. An optically addressed spatial light modulating system according to claim 1; further comprising a liquid crystal layer between the pair of transparent substrates.

3. An optically addressed spatial light modulating system according to claim 2; wherein the liquid crystal layer is composed of ferroelectric liquid crystal material.

4. An optically addressed spatial light modulating system according to claim 1; wherein the bias light irradiation means comprises a bias light source and a bias light power source for supplying an electrical power to the bias light source.

5. An optically addressed spatial light modulating system according to claim 4; further comprising driving means for supplying voltage signals including writing voltage signals to the spatial light modulator; and wherein the bias light adjusting means controls synchronous signals applied to both the driving means and the bias light power source to adjust an overlapping time period of both the irradiating time period of the bias light and the applying time period of the writing voltage signals.

6. An optically addressed spatial light modulating system according to claim 4; wherein the bias light adjusting means controls the electrical power from the bias light power source to adjust an intensity of the bias light.

7. A method for driving an optically addressed spatial light modulating system having a spatial light modulator, writing light irradiation means, bias light irradiation means having a bias light source and a bias light power source for supplying an electrical power to the bias light source, and reading out light irradiation means, the method comprising the steps of: irradiating a writing light from the writing light irradiation means onto the spatial light modulator to record an image; irradiating a bias light from the bias light irradiation means onto the spatial light modulator to adjust a recording sensitivity of the spatial light modulator while irradiating the writing light onto the spatial light modulator; irradiating a reading out light from the reading out light irradiation means onto the spatial light modulator to read out the recorded image; and controlling the electrical power from the bias light power source to adjust a light intensity of the bias light.

8. An optically addressed spatial light modulating system comprising: a spatial light modulator; writing light irradiation means for irradiating a writing light to record an image onto the spatial light modulator; reading out light irradiation means for irradiating a reading out light to read out the recorded image from the spatial light modulator; bias light irradiation means for irradiating a bias light onto the spatial light modulator to adjust a recording sensitivity of the spatial light modulator, the bias light irradiation means having a bias light source and a bias light power source for supplying an electrical power to the bias light source; bias light adjusting means for adjusting at least one of the irradiation time and the light intensity of the bias light; and driving means for supplying voltage signals including writing voltage signals to the spatial light modulator; wherein the bias light adjusting means controls synchronous signals applied to both the driving means and the bias light power source to adjust an overlapping time period of both the irradiating time period of the bias light and the applying time period of the writing voltage signals.

9. An optically addressed spatial light modulating system according to claim 8; wherein the spatial light modulator comprises a pair of transparent substrates sandwiching a liquid crystal layer, and a photoconductive layer formed on at least one inner side of the pair of transparent substrates.

10. An optically addressed spatial light modulating system according to claim 9; wherein the liquid crystal layer is composed of ferroelectric liquid crystal material.

11. An optically addressed spatial light modulating system comprising: a spatial light modulator; writing light irradiation means for irradiating a writing light to record an image onto the spatial light modulator; reading out light irradiation means for irradiating a reading out light to read out the recorded image from the spatial light modulator; bias light irradiation means for irradiating a bias light onto the spatial light modulator to adjust a recording sensitivity of the spatial light modulator, the bias light irradiation means comprising a bias light source and a bias light power source for supplying an electrical power to the bias light source; and bias light adjusting means for controlling the electrical power from the bias light power source to thereby adjust the light intensity of the bias light.

12. An optically addressed spatial light modulating system according to claim 11; wherein the spatial light modulator comprises a pair of transparent substrates sandwiching a liquid crystal layer, and a photoconductive layer formed on at least one inner side of the pair of transparent substrates.

13. An optically addressed spatial light modulating system according to claim 12; wherein the liquid crystal layer is composed of ferroelectric liquid crystal material.

14. A method for driving an optically addressed spatial light modulating system having a spatial light modulator, writing light irradiation means, bias light irradiation means having a bias light source and a bias light power source for supplying an electrical power to the bias light source, reading out light irradiation means, driving means for supplying voltage signals including writing voltage signals to the spatial light modulator, and bias light adjusting means for adjusting a light intensity of the bias light, the method comprising the steps of: irradiating a writing light from the writing light irradiation means onto the spatial light modulator to record an image; irradiating a bias light from the bias light irradiation means onto the spatial light modulator to adjust a recording sensitivity of the spatial light modulator while irradiating the writing light onto the spatial light modulator; irradiating a reading out light from the reading out light irradiation means onto the spatial light modulator for reading out the recorded image; and controlling synchronous signals applied to both the driving means and the bias light power source to adjust a time period of irradiating the bias light overlapping with at least a part of a time period of the writing voltage signals applied from the driving means to the spatial light modulator.

* * * * *